June 5, 1951 — E. J. WELLAUER — 2,555,909
FLEXIBLE COUPLING
Filed July 7, 1949 — 2 Sheets-Sheet 1

INVENTOR.
Edward J. Wellauer
BY
Charles & French
ATTORNEYS

June 5, 1951   E. J. WELLAUER   2,555,909
FLEXIBLE COUPLING

Filed July 7, 1949   2 Sheets-Sheet 2

INVENTOR.
Edward J. Wellauer
BY
Charles & French
ATTORNEYS

Patented June 5, 1951

2,555,909

UNITED STATES PATENT OFFICE 2,555,909

FLEXIBLE COUPLING

Edward J. Wellauer, Wauwatosa, Wis., assignor to The Falk Corporation, Milwaukee, Wis., a corporation of Wisconsin Application July 7, 1949, Serial No. 103,358

4 Claims. (Cl. 64—15)

The invention relates to power transmission couplings in which the coupling members on the shafts to be coupled are formed with axially directed peripheral grooves and are operatively connected together in driving relation by resilient interconnecting members.

The general object of the invention is to provide a coupling arrangement in which separate grid elements between the couplings are used as distinguished from a continuous grid element and in which these separate grid elements are so arranged and disposed relative to each other and the coupling members as to provide a construction which will possess the advantages of a continuous grid as well as additional advantages due to the type of laminated grid arrangement used. As compared to the coupling using a continuous grid, the separate grid element structure herein is cheaper to produce and assemble, possesses greater deflection because of the laminated construction, has less end thrust, combined axial and articulated movement of the elements is inherent, greater damping capacity is possible, less chance of pounding of grids against cover, no necessity for grinding the ends of the grids for fitting and the overall fatigue strength of the coupling will be increased.

A further object of the invention is to provide a coupling of the type described in which not only the intermediate portions of the grids form torque transmitting beams supported at their ends by the adjacent coupling members but also the ends of said grids extending beyond said coupling members produce a driving torque.

The invention further consists in the several features hereinafter set forth and more particularly defined by claims at the conclusion hereof.

Figure 1:
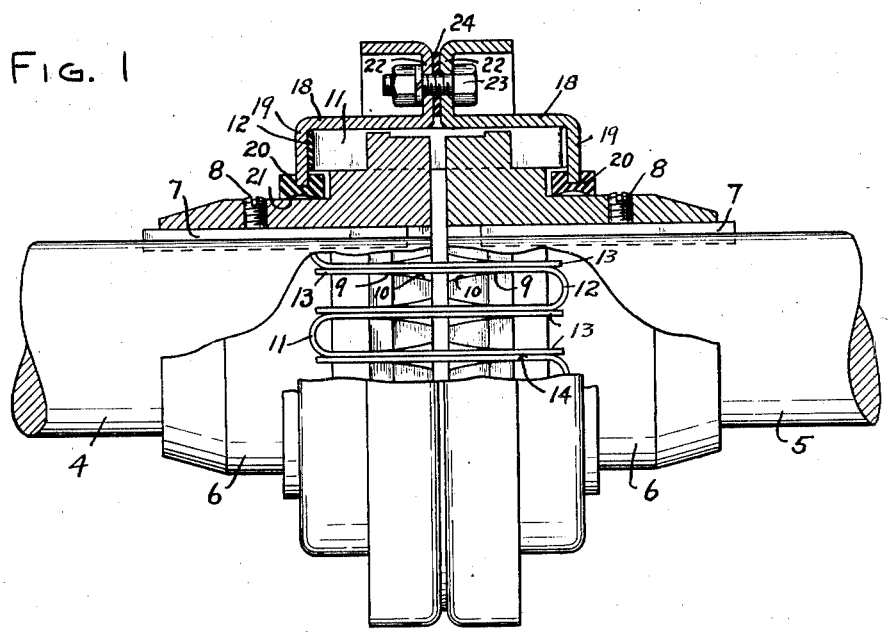
Fig. 1 is an elevation view with parts broken away and parts shown in section of a coupling embodying the invention in a non-loaded condition.

Referring to the drawings in each instance, the numerals 4 and 5 designate substantially axially alined shafts, either one of which may be the driver and the other the driven, and 6 a coupling member for each shaft secured to be driven thereby by a key 7 locked against endwise movement by a set screw 8.

Figure 3:
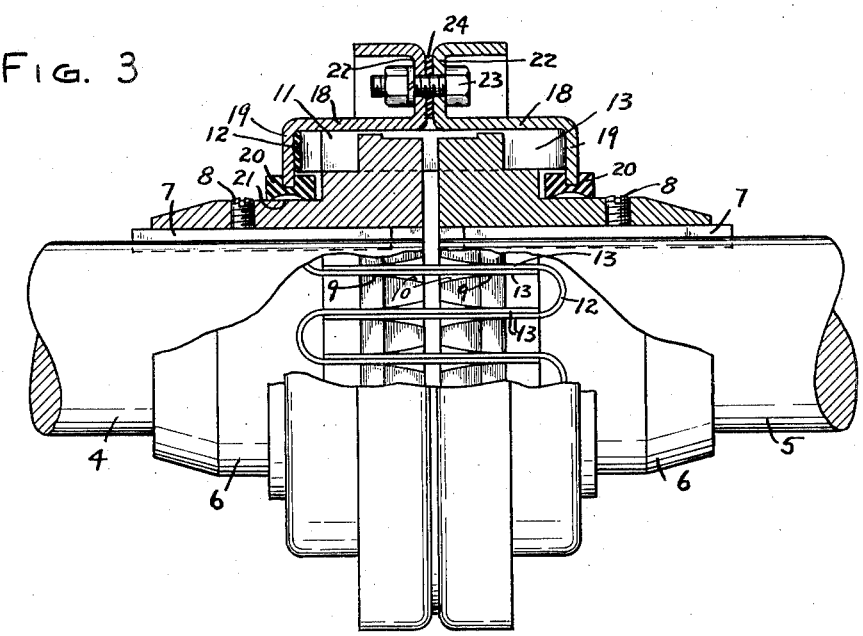
Fig. 3 is a view similar to Fig. 1 showing certain modifications.

Each coupling member 6 is provided with a plurality of circumferentially spaced teeth forming axially directed grooves 9 which preferably diverge or taper outwardly at 10 toward the inner face of the coupling. The grooves 9 are equally spaced and adjacent grooves of the two coupling members are substantially axially alined with each other in the normal or unloaded condition of the structure, as shown in Figs. 1 and 3.

Figure 2:
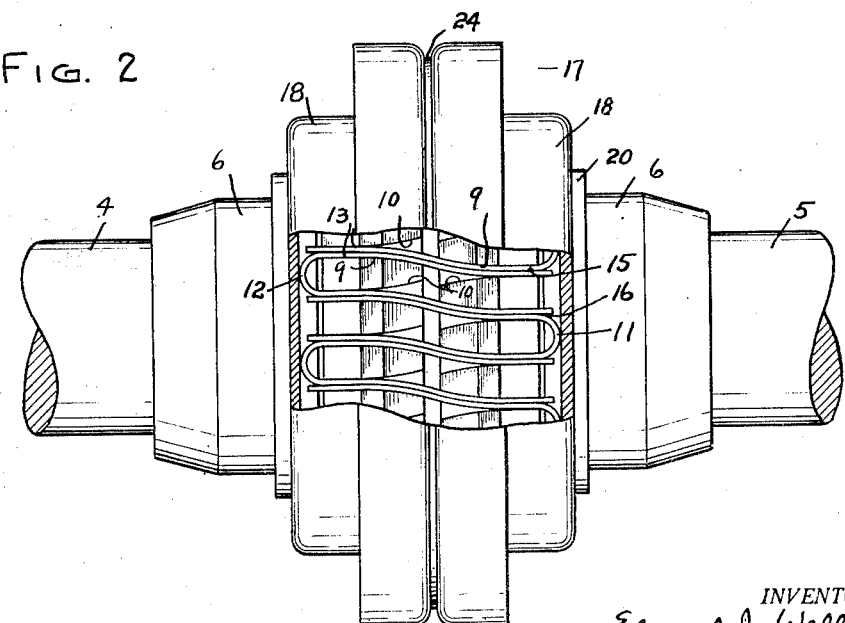
Fig. 2 is a view of the structure of Fig. 1 showing the parts under a driving load.
Figure 4:
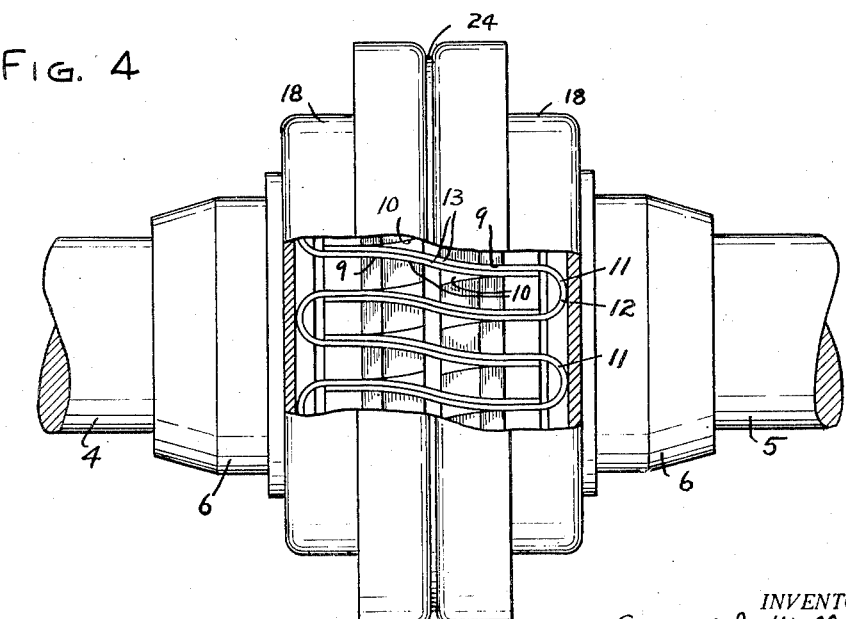
Fig. 4 is a view of the structure shown in Fig. 3 showing the parts under a driving load.

Referring to Figs. 1 and 2, the coupling members 6 are operatively connected together by a plurality of connecting members or U-shaped spring grid elements 11. These elements are preferably made from rectangular spring metal stock bent into U-form with curved end portions 12 and straight legs 13. They are arranged in laminated relation with each other with their curved ends 12 alternately disposed so that the leg 13 of one element engages one side of a groove 9 and the abutting leg 13 of other elements engages the other side of this same groove. The grids 11 are of a length so that the end portions 12 and portions of the legs 13 extend beyond the grooves 9 so that not only is their driving engagement between the abutting parts of the legs 13 extending between the grooves and which in effect form laminated beams with supported ends, but those portions of the elements extending beyond the grooves have cantilever drive connections with each other. The abutting frictional surfaces of the grid elements at the point 14 provide for additional damping effects. At point 15 there is free end movement along this surface while in the area 16 considering anticlockwise rotation of shaft 4 in Fig. 2 interference between the end portions of the elements provides a restraining end movement. The double laminations increase the deflection, reduce the stresses, and increase the impact resistance of the elements. The side by side arrangement of the grid elements as shown in Figs. 1 and 2 is preferred, but as an alternative I have shown in Figs. 3 and 4 an intermeshed or overlapped relation of the grid elements 11 in which the leg 13 of one grid element abuts the inside surface of the leg 13 of the other grid element with which it cooperates to form a laminated driving connection, the action of these elements being similar to that of the first described construction.

In each instance the grid elements are enclosed in a housing formed of complementary flanged cylindrical members 18 whose flanges 19 carry rubber rings 20 which fit the cylindrical surface 21 of each coupling member 6, said members 20 having flanges 22 secured together by a series of radially disposed bolts 23 with a rubber sealing ring 24 disposed between them. The housing is preferably packed with grease or other suitable lubricant.

I desire it to be understood that this invention is not to be limited to any particular form or arrangement of parts except in so far as such limitations are included in the claims.

What I claim as my invention is:

1. In a flexible coupling, the combination of a pair of axially alined laterally disposed coupling members, each provided with axially directed peripheral grooves, the grooves of one coupling member normally alining with those of the other coupling member, and alternately U-shaped spring grid elements operatively connecting said members together and having the intermediate portions of their legs disposed in said grooves in abutting relation and extending transversely of both of said alined grooves with their transverse portions lying beyond said grooves.

2. In a flexible coupling, the combination of a pair of axially alined laterally disposed members, each provided with axially directed peripheral grooves, the grooves of one coupling member normally alining with those of the other coupling member, and alternately disposed U-shaped spring grid elements operatively connecting said members together and having their legs disposed in said grooves in abutting relation and extending transversely thereof and also having abutting portions extending beyond said grooves in driving relation and having free end movement relative to each other.

3. The flexible coupling as defined in claim 1 in which the legs of the U-shaped grid elements are arranged in side by side abutting relation.

4. The flexible coupling as defined in claim 1 in which the legs of the U-shaped grid elements are arranged in overlapping abutting relation.

EDWARD J. WELLAUER.

REFERENCES CITED

The following references are of record in the file of this patent:

UNITED STATES PATENTS

| Number | Name | Date |
|---|---|---|
| 1,857,679 | Thomas | May 10, 1932 |
| 1,868,544 | Serrell | July 26, 1932 |
| 1,874,681 | Woolson | Aug. 30, 1932 |
| 1,891,969 | Bibby | Dec. 27, 1932 |
| 1,935,730 | Smith | Nov. 21, 1933 |

FOREIGN PATENTS

| Number | Country | Date |
|---|---|---|
| 163,990 | Great Britain | 1921 |